(12) United States Patent
Ahmadi et al.

(10) Patent No.: US 8,218,424 B2
(45) Date of Patent: Jul. 10, 2012

(54) TRANSMISSION OF SYSTEM CONFIGURATION INFORMATION IN MOBILE NETWORKS

(75) Inventors: Sassan Ahmadi, Portland, OR (US); Shantidev Mohanty, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 308 days.

(21) Appl. No.: 12/638,846

(22) Filed: Dec. 15, 2009

(65) Prior Publication Data

US 2011/0141981 A1 Jun. 16, 2011

Related U.S. Application Data

(60) Provisional application No. 61/142,582, filed on Jan. 5, 2009.

(51) Int. Cl.
*H04J 11/00* (2006.01)
(52) U.S. Cl. .................. 370/208; 370/252; 375/260
(58) Field of Classification Search .......... 370/321–327, 370/328–338, 478, 394–427, 473, 252–253, 370/208–209; 455/450; 375/260
See application file for complete search history.

(56) References Cited

U.S. PATENT DOCUMENTS

| 2005/0238016 A1 | 10/2005 | Nishibayashi et al. |
| 2006/0153203 A1 | 7/2006 | Del Prado Pavon et al. |
| 2010/0002631 A1* | 1/2010 | Cho et al. .............. 370/328 |
| 2011/0200001 A1* | 8/2011 | Choi .................... 370/329 |

FOREIGN PATENT DOCUMENTS

WO WO 2010/078600 7/2010

OTHER PUBLICATIONS

International Search Report and Written Opinion from PCT Application No. PCT/US2010/020166 mailed Aug. 20, 2010, 9 pages.
International Preliminary Report on Patentability for International Patent Application No. PCT/US2010/020166, Mailed Jul. 14, 2011, 6 pages.

* cited by examiner

*Primary Examiner* — Pao Sinkantarakorn
*Assistant Examiner* — Iqbal Zaidi
(74) *Attorney, Agent, or Firm* — Cool Patent, P.C.; Joseph P. Curtin (57) ABSTRACT

An apparatus to communicate system configuration information of a wireless communication network is presented. In one embodiment, the apparatus uses orthogonal frequency division multiple access (OFDMA) techniques. The apparatus processes a super-frame containing a plurality of frames for communication using. The first frame of the plurality of frames comprises a primary super-frame header and a secondary super-frame header. The primary super-frame header comprises data indicative of whether each one or more sub-packets exist in the secondary super-frame header.

12 Claims, 7 Drawing Sheets

TRANSMISSION OF SYSTEM CONFIGURATION INFORMATION IN MOBILE NETWORKS

CROSS-REFERENCE TO RELATED APPLICATIONS

This application claims the benefit of U.S. Provisional Application No. 61/142,582, filed on Jan. 5, 2009, entitled "Advanced Wireless Communication Systems and Techniques", and the contents of which incorporated herein by reference as if set forth herein in full.

FIELD OF THE INVENTION

Embodiments of the invention relate to the field of wireless communications.

BACKGROUND OF THE INVENTION

Mobile Worldwide Interoperability for Microwave Access (WiMAX) is a broadband wireless access technology based on Institute of Electrical and Electronics Engineers (IEEE) 802.16 standard. Mobile WiMAX uses a scalable orthogonal frequency division multiple access (OFDMA) scheme to deliver wireless broadband packet data services to mobile terminals. In mobile WiMAX based on IEEE 802.16e standard, the system configuration information is transmitted from a base station (BS) to a subscriber stations (SSs) by using Downlink Channel Descriptor (DCD) and Uplink Channel Descriptor UCD) messages. The DCD and UCD messages are transmitted by a base station at regular intervals. The SSs use the information contained in DCD and UCD messages to learn about the downlink (DL) and uplink (UL) channel, respectively.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Embodiments of an apparatus to communicate system configuration information of a wireless communication network are presented. In one embodiment, the apparatus communicates using orthogonal frequency division multiple access (OFDMA) techniques. The apparatus processes a super-frame containing a plurality of frames for communication. The first frame of the plurality of frames comprises a primary super-frame header and a secondary super-frame header. The primary super-frame header comprises data indicative of whether each one or more sub-packets exist in the secondary super-frame header.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the registers and memories of the computer system into other data similarly represented as physical quantities within the computer system memories or registers or other, such information storage, transmission or display devices.

Embodiments of present invention also relate to apparatuses for performing the operations herein. Some apparatuses may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for transmission of system configuration information. Specifically, system configuration information in a mobile network is primarily discussed in reference to a WiMAX network. The methods and apparatus for transmission of system configuration information are, however, not so limited, as they may be implemented on or in association with any integrated circuit device or system, such as cell phones, personal digital assistants, embedded controllers, mobile platforms, desktop platforms, and server platforms, as well as in conjunction with other resources.

The following inventive embodiments may be used in a variety of applications including transmitters and receivers of a radio system. Radio systems specifically included within the scope of the present invention include, but are not limited to, network interface cards (NICs), network adaptors, mobile stations, base stations, access points (APs), hybrid coordinators (HCs), gateways, bridges, hubs, routers, relay stations, repeaters, analog repeaters, and amplify and forward repeaters. Further, the radio systems within the scope of the invention may include cellular radio telephone systems, satellite systems, personal communication systems (PCS), two-way radio systems, and two-way pagers as well as computing devices including radio systems, such as personal computers (PCs) and related peripherals, personal digital assistants (PDAs), personal computing accessories, and all existing and future arising systems which may be related in nature and to which the principles of the inventive embodiments could be suitably applied.

While the following detailed description may describe example embodiments of the present invention in relation to wireless metropolitan area networks (WMANs) or other wireless wide area networks (WWANs), the embodiments are not limited thereto and can be applied to other types of wireless networks in which similar advantages may be obtained. Such networks for which inventive embodiments may be applicable specifically include, wireless personal area networks (WPANs), wireless local area networks (WLANs), WW ANs such as cellular networks, or combinations of any of these networks. Further, inventive embodiments may be discussed in reference to wireless networks utilizing Orthogonal Frequency Division Multiplexing (OFDM) modulation. The embodiments of present invention are not, however, limited thereto and, for example, the embodiments can be implemented using other modulation or coding schemes where suitably applicable.

Overview

Figure 1A:
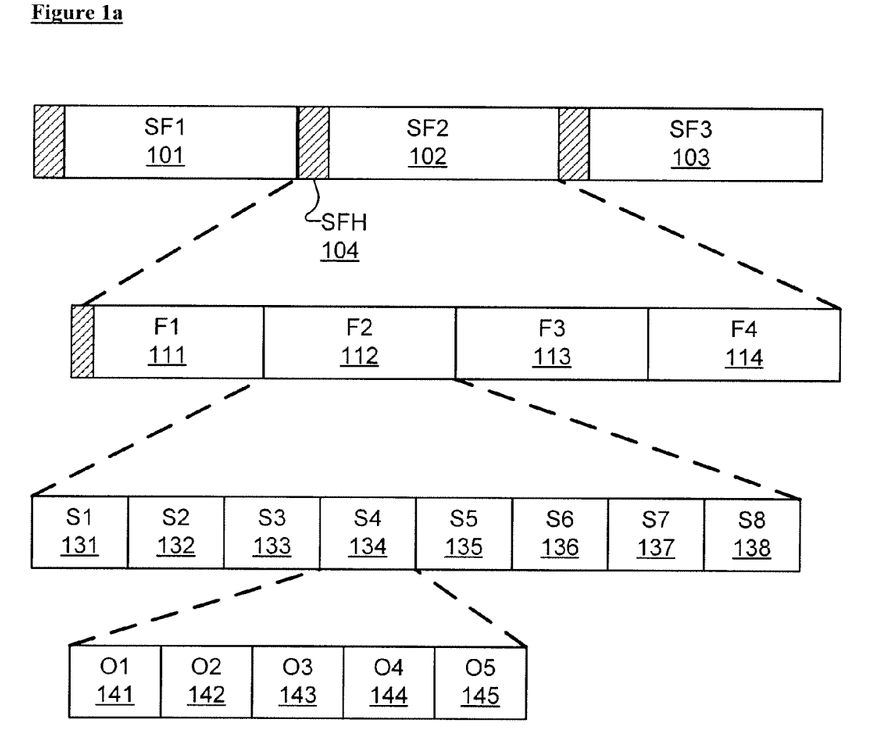
FIG. 1a shows a breakdown of a super-frame into frames, sub-frames, and OFDMA symbols, according to an embodiment of the invention.

FIG. 1a shows a breakdown of a super-frame into frames, sub-frames, and OFDMA symbols, according to an embodiment of the invention. Referring to FIG. 1a, in one embodiment, a super-frame (e.g., super-frames 101-103) includes an integer multiple of radio frames aggregated together in a serial manner, with each frame starting after the preceding frame. In one embodiment, a super-frame starts with a super-frame header (SFH 104) in the first frame (e.g., frame 111) of the super-frame.

In one embodiment, a super-frame is a structured data sequence of a fixed duration (e.g., 20 ms) in accordance with a wireless network standard. In one embodiment, a super-frame comprises four frames (e.g., frames 111-114) as shown in FIG. 1a.

In one embodiment, a sub-frame is a structured data sequence of a pre-defined duration (e.g., 0.617 ms) in accordance to a wireless network standard.

In one embodiment, SFH 104 is in the first frame (frame 111) within a super-frame (e.g., super-frame 102). In one embodiment, SFH 104 contains system configuration information and other broadcast information. In one embodiment, SFH 104 carries essential system parameters and configuration information. In other embodiment, certain contents of SFH 104 (e.g., types of network configuration information) are repeated at intervals of every 'n' super-frames, in which n is an integer. In one embodiment, the structure of SFH 104 is based on IEEE 802.16 m standard.

In one embodiment, a frame includes several sub-frames (sub-frames 131-138). In one embodiment, each sub-frame includes a number of OFDMA symbols (e.g., OFDMA symbols 141-145). In other embodiments, the number of frames, the number of sub-frames, and the number of OFDMA symbols are varied according to different wireless protocols.

Figure 1B:
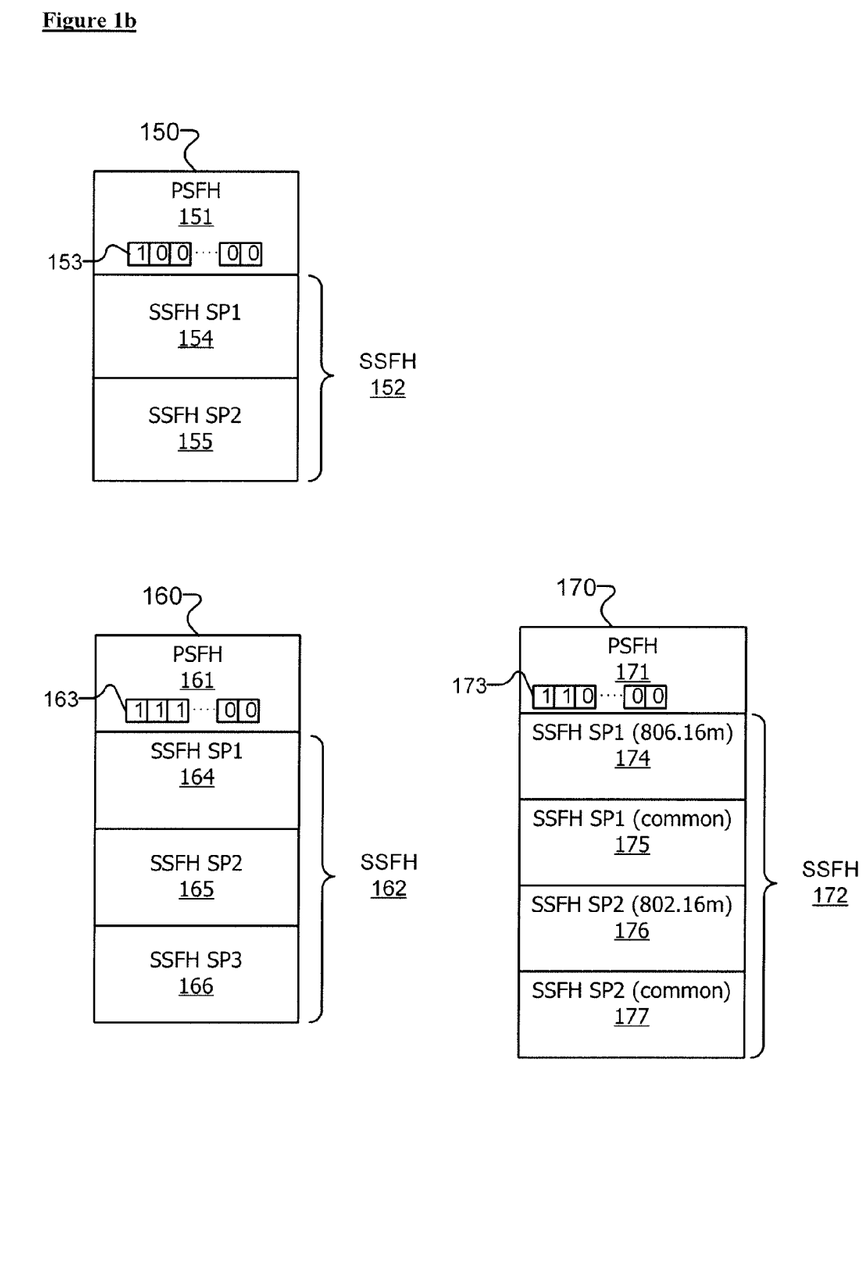
FIG. 1b shows embodiments of a super-frame header (SFH) including a secondary super-frame header (SSFH).

FIG. 1b shows embodiments of an SFH including a secondary super-frame header (SSFH). Referring to FIG. 1b, in one embodiment, SFH 150 includes two parts, i.e., a primary super-frame header (e.g., PSFH 151) and a secondary super-frame header (e.g., SSFH 152). In one embodiment, SSFH 152 includes two sub-packets (i.e., SP1 154 and SP2 155). In one embodiment, SFH 150 further includes other control information and data (not shown).

In other embodiments, PSFH 151 and SSFH 152 are known as a primary broadcast channel and a secondary broadcast channel respectively. In one embodiment, an SFH does not contain an SSFH.

In another embodiment, SFH 150 includes PSFH 151 and SSFH 152 which contains SP1 154. In one embodiment, SFH 150 includes PSFH 151 and SSFH 152 which contains SP1 155. In one embodiment, SFH 150 includes PSFH 151 and a number of sub-packets in SSFH 152.

In one embodiment, PSFH 151 contains information to decode SSFH 152. In one embodiment, PSFH 151 includes data fields, such as, for example, a system bandwidth index (e.g., 4-5 bits data to indicate system bandwidth), a transmission format of SSFH 152 (3-4 bits), least-significant bits of a super-frame number (3-4 bits), the size of SSFH 152, SSFH scheduling information, and a CRC (8-16 bits).

In one embodiment, SSFH 152 contains the rest of system configuration information. In one embodiment, system information is transmitted in a flexible manner by using different structures of SSFHs (e.g., SSFH 152, SSFH 162, and SSFH 172). In one embodiment, SSFH 152 is always transmitted after PSFH 151. In one embodiment, the location of SSFH 152 is fixed after PSFH 151 such that there is no need to include the location in a MAP (media access protocol) message.

In one embodiment, contents of sub-packets in SSFH 152 includes system information (parameters), such as, for example, uplink ACK/NACK channel resource size information, downlink ACK/NACK channel resource size information, a power control channel resource size indicator, downlink permutation configuration information, uplink permutation configuration information, ranging allocation interval channel information, ranging codes subset, partition configurations, cell bar information, start super-frame offsets, duplexing mode information, sub-frame configurations, fractional frequency reuse partitioning information, mobile station transmit power limitation, uplink fast feedback size information, default received signal strength index information, signal to interference and noise ratio averaging parameter, transmit power report information, handoff ranging backoff start and end information, an uplink sub-frame bitmap for sounding, sounding multiplexing type information (SMT), etc. In one embodiment, each piece of the information set forth above is categorized into one or more sub-packets.

In one embodiment, contents of SSFH 152 include one or more sub-packets (e.g., SP1 154 and SP2 155). In one embodiment, PSFH 151 includes bitmap 153 in which each bit of bitmap 153 indicates whether or not a corresponding sub-packet exists in SSFH 152.

In one embodiment, the first bit (most significant bit) of bitmap 153 corresponds to SP1 154, the second bit of bitmap 153 corresponds to SP2 155, and so on. In one embodiment, a particular bit of bitmap 153 is set to "1" if the corresponding sub-packet is included in SSFH 152. On the other hand, a particular bit of bitmap 153 is set to "0", if the corresponding sub-packet is not included in SSFH 152.

In one embodiment, a lower-order sub-packet (e.g., sub-packet SP1 154 and sub-packet SP2 155) is transmitted more frequently compared to a higher-order subpacket (e.g., sub-packet 3, sub-packet 4). For example, the frequency of sub-packet 1 (SP1 154) is the highest among other sub-packets, therefore system information (parameters) that require a low-latency transmission is transmitted in SP1 154.

In one embodiment, SFH 160, for example, includes PSFH 161 and SSFH 162. Bitmap 163 indicates that, SSFH 162 contains three sub-packets (i.e., SP1 164, SP2, 165, and SP3 166). In other embodiments, SP1 164 exists in every SSFH. In one embodiment, bitmap 163 is included in SP1 164 instead of PSFH 161. It is appreciated by those of ordinary skill in the art that any number of sub-packets may be used in accordance with the embodiment.

In one embodiment, SFH 170 shows a structure of SSFH (i.e., SSFH 172) in a mixed-mode operation (e.g., a mobile system based on both the IEEE 802.16e and IEEE 802.16m). In one embodiment, if the system operates based on IEEE 802.16e in conjunction with IEEE 802.16m, some of the system configuration information is common to these two network standards. Transmission of such information in accordance to each standard in a separate manner is unnecessary and incurs undesired overhead.

In one embodiment, each sub-packet in SSFH 172 includes two portions (SP1 174 and SP1 175). The first portion (SP1 174) includes system information which is common to IEEE 802.16e and IEEE 802.16m. A second portion (SP1 175) includes system information for use in a system based on IEEE 802.16m. It is appreciated by those of ordinary skill in the art that different system information common to two or more networks may be grouped into a common portion in any combination to save transmission overhead. In one embodiment, a single bit in each sub-packet (not shown) is used to indicate the inclusion or exclusion of system information common to both standards in the sub-packet.

In one embodiment, embodiments of SSFH shown in FIG. 1b are flexible for different deployment scenarios. In one embodiment, the transmission overhead of system configuration information is reduced by using an SSFH which include one or more sub-packets of different transmission intervals.

Figure 2:
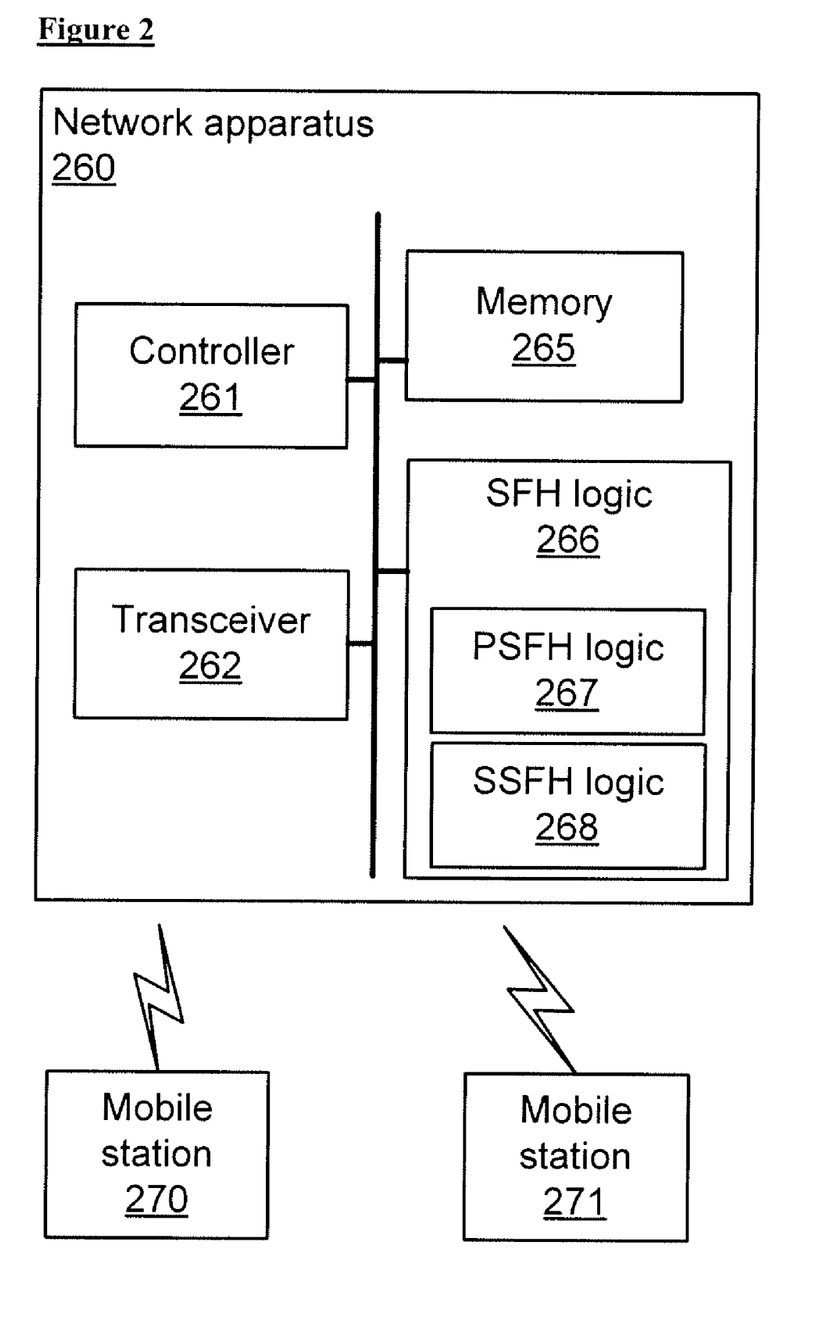
FIG. 2 shows a block diagram of a network apparatus in accordance with one embodiment of the invention.

FIG. 2 shows a block diagram of a network apparatus in accordance with one embodiment of the invention. Many related components, such as data buses and peripherals, have not been shown to avoid obscuring the invention. Referring to FIG. 2, in one embodiment, network apparatus 260 comprises controller 261, transceiver 262, SFH logic 266, and memory 265. In one embodiment, network apparatus 260 communicates with mobile station 270 and mobile station 271. In one embodiment, SFH logic 266 further includes PSFH logic 267 and SSFH logic 268.

In one embodiment, controller 261 controls operations of network apparatus 260. In one embodiment, controller 261 manages generation of network frames, scheduling of network frames, and monitoring system performance. In one embodiment, memory 265 stores programs to be executed by controller 261.

In one embodiment, transceiver 262 includes physical (PHY) layer circuitry for communicating with the physical mediums (wireless or otherwise), media access control (MAC) layer circuitry, and higher-level layer (HLL) circuitry. In one embodiment, PHY layer circuitry, MAC layer circuitry, and HLL circuitry comprise functionality for both receiver and transmitter operations and include processing circuitry to evaluate communications from network apparatus 260, among other things. In one embodiment, transceiver 262 is connected to a core network, such as an Internet protocol (IP) network, via a wireless connection, a physical-wired connection (e.g., electrical or fiber-optic connection), or both.

In one embodiment, SFH logic 266 processes super-frame headers. In one embodiment, SFH logic 266 encodes super-frame headers, decodes super-frame headers, or both.

In one embodiment, PSFH 267 processes a primary super-frame header. In one embodiment, SSFH logic 268 processes a secondary super-frame header. In one embodiment, SSFH logic 268 encodes contents of an SSFH, decodes contents of an SSFH, or both.

In one embodiment, SSFH logic 268 is capable of processing sub-packets of a SSFH in accordance to one or more wireless standards. In one embodiment, SSFH logic 268 generates sub-packets based on whether network apparatus 260 operates in conjunction with an IEEE 802.16e based network, an IEEE 802.16m based network, or both.

In one embodiment, the transmission intervals for sub-packets are different. SSFH logic 268 includes some of the system configuration information which requires more frequent broadcast in sub-packets which are transmitted more frequently.

In other embodiments, parameters of system configuration information are categorized into different sub-packets. In one embodiment, SSFH logic 268 determines whether or not to include a sub-packet in an SSFH based on different latency requirements of system configuration information. If the latency requirement of system configuration information in a sub-packet is stringent, the sub-packet is going to be transmitted more frequently (e.g., every 20 ms) than those sub-packets of a less stringent requirement (e.g., every 200 ms). In one embodiment, SSFH logic 268 includes some sub-packets in every SSFH if the latency requirement of the sub-packet is very stringent.

In one embodiment, SSFH logic 268 determines the intervals to transmit different sub-packets. In one embodiment, the network performance remains satisfactory even though SSFH logic 268 determines to omit a sub-packet because the latency requirement of the sub-packet is low. Consequently, the sub-packet is transmitted only at a longer interval.

In one embodiment, network apparatus 260 comprises, for example, client devices and network points of attachments. In one embodiment, network apparatus 260 is fixed, stationary, or mobile depending on the particular environment or implementation and communicates over the medium of free space generally referred to as the "air interface" (e.g., wireless shared media).

In one embodiment, network apparatus 260 comprises wireless devices that comply with or operate in accordance with one or more protocols, such as, for example, WiFi, Bluetooth, UWB, WiMAX, and cellular protocols. Network apparatus 260 comprises, but is not necessarily limited to, a computer, server, workstation, laptop, ultra-laptop, handheld computer, telephone, cellular telephone, personal digital assistant (PDA), router, switch, bridge, hub, gateway, wireless device, multi-network, multiple integrated radio devices, mixed-network device supporting multiple concurrent radios, WiFi plus cellular telephone, portable digital music player, pager, two-way pager, mobile subscriber station, printer, camera, enhanced video and voice device, and any other one-way or two-way device capable of communicating with other devices or base stations. The embodiments are not limited in this context.

Figure 3A:
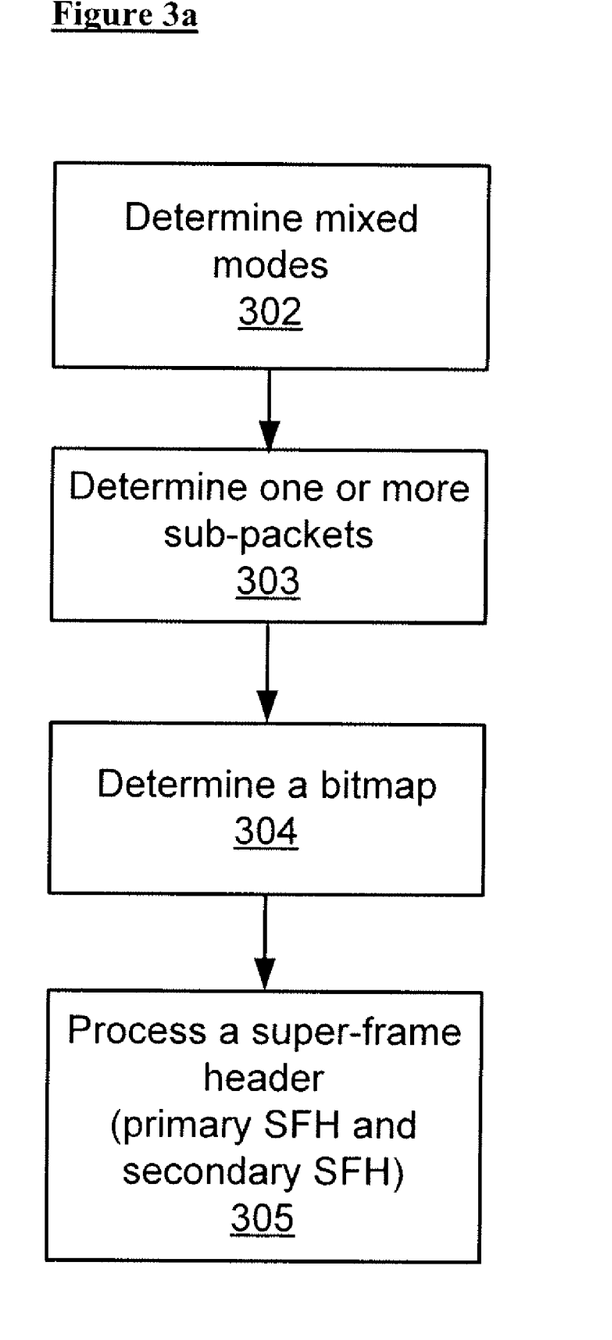
FIG. 3a is a flow diagram of one embodiment of a process to transmit system configuration information.

FIG. 3a is a flow diagram of one embodiment of a process to transmit system configuration information. The process is performed by processing logic that may comprise hardware (circuitry, dedicated logic, etc.), software (such as one that is run on a general-purpose computer system or a dedicated machine), or a combination of both. In one embodiment, the process is performed in conjunction with a network apparatus (e.g., network apparatus with respect to FIG. 2). In one embodiment, the process is performed by a computer system,. such as the computer system shown in FIG. 5.

Referring to FIG. 3a, in one embodiment, processing logic begins by determining whether to use a mixed-mode operation format based on whether transmissions are of different wireless standards (processing block 302). In one embodiment, processing logic generates sub-packets based on whether a network apparatus operates in conjunction with an IEEE 802.16e based network, an IEEE 802.16m based network, or both.

In one embodiment, some sub-packets include a portion which includes system configuration information (parameters) common to network standards (e.g., IEEE 802.16e based network and IEEE 802.16m based network) and a second portion dedicated to only a network standard (e.g., IEEE 802.16m based network).

In one embodiment, processing logic determines which sub-packet (sub-packet 1, sub-packet 2, sub-packet 3, etc.) to include in a secondary super-frame header (SSFH) (processing block 303). In one embodiment, a sub-packet corresponds to an information element (IE).

In one embodiment, transmission intervals of the sub-packets are different. Processing logic includes some of the system configuration information which requires more frequent broadcasting in sub-packets which are transmitted more frequently. For example, processing logic sends a sub-packet in every SSFH if the latency requirement of the sub-packet is very high.

In one embodiment, processing logic determines which sub-packets to include based on the latency requirements of system configuration information in the sub-packets. In one embodiment, network performance remains satisfactory even though processing logic determines to omit a sub-packet in some SSFHs if the latency requirement of contents in the sub-packet is low.

In one embodiment, processing logic generates a bitmap (processing block 304). Each bit of the bitmap indicates whether or not a corresponding sub-packet exists in an SSFH.

In one embodiment, processing logic generates a super-frame header which includes a primary SFH and a secondary SFH (processing block 305).

Figure 3B:
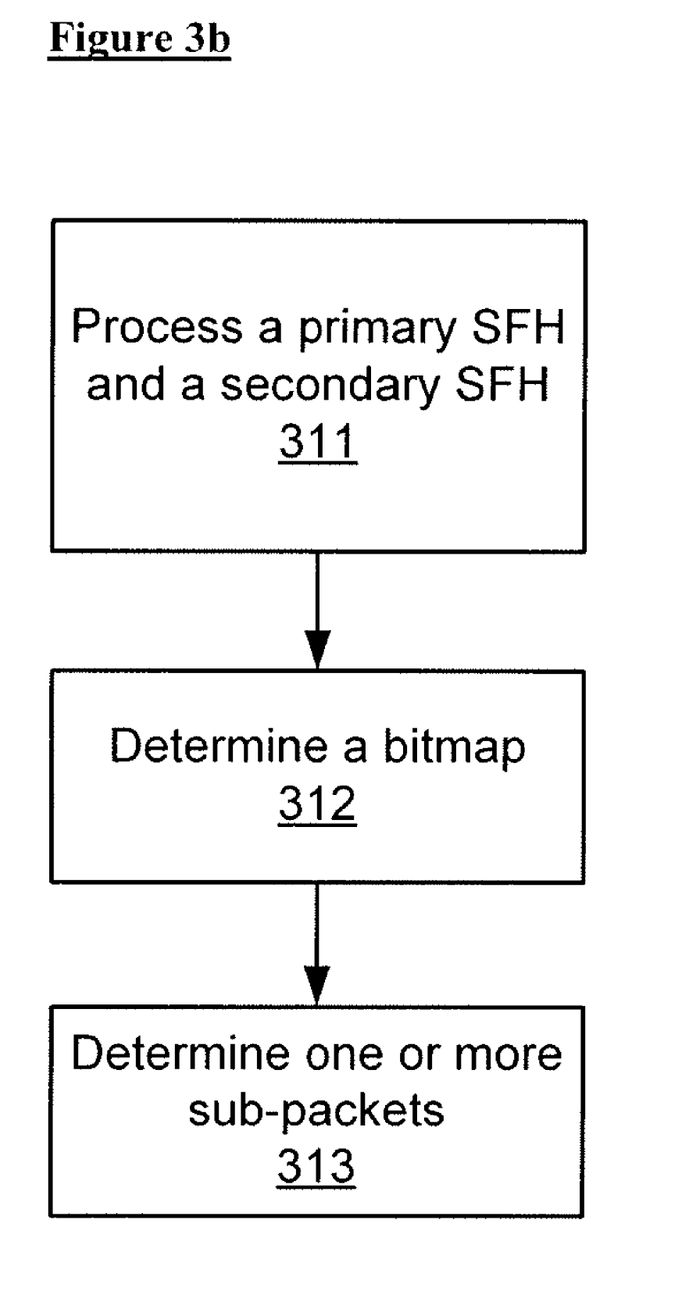
FIG. 3b is a flow diagram of one embodiment of a process to receive system configuration information.

FIG. 3b is a flow diagram of one embodiment of a process to receive system configuration information. The process is performed by processing logic that may comprise hardware (circuitry, dedicated logic, etc.), software (such as one that is run on a general-purpose computer system or a dedicated machine), or a combination of both. In one embodiment, the process is performed in conjunction with a network apparatus (e.g., network apparatus with respect to FIG. 2). In one embodiment, the process is performed by a computer system, such as the computer system shown in FIG. 5.

Referring to FIG. 3b, in one embodiment, processing logic begins by processing a primary super-frame header (PSFH) and a secondary super-frame header (SSFH) (processing block 311).

In one embodiment, processing logic reads a bitmap which is included in a PSFH (processing block 312). In one embodiment, processing logic determines which sub-packets exist in an SSFH based on the bitmap (processing block 313). In one embodiment, processing logic decodes the sub-packets based at least on whether a network apparatus operates in conjunction with an IEEE 802.16e based network, an IEEE 802.16m based network, or both.

In one embodiment, some sub-packets include a portion which includes system configuration information (parameters) common to network standards (e.g., IEEE 802.16e based network and IEEE 802.16m based network) and a second portion dedicated to only a network standard (e.g., IEEE 802.16m based network).

Figure 4:
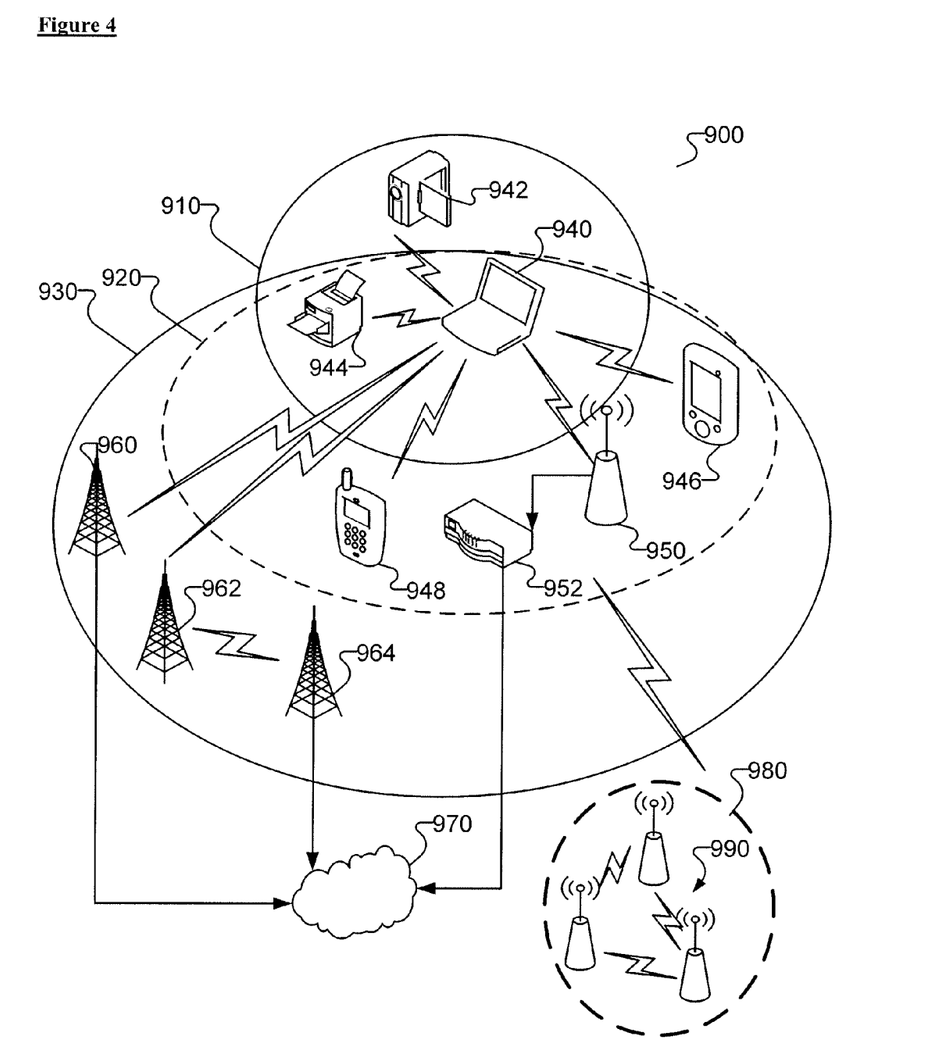
FIG. 4 is a diagram representation of a wireless communication system in accordance with one embodiment of the invention.

FIG. 4 is a diagram representation of a wireless communication system in accordance with one embodiment of the invention. Referring to FIG. 4, in one embodiment, wireless communication system 900 includes one or more wireless communication networks, generally shown as 910, 920, and 930.

In one embodiment, the wireless communication system 900 includes a wireless personal area network (WPAN) 910, a wireless local area network (WLAN) 920, and a wireless metropolitan area network (WMAN) 930. In other embodiments, wireless communication system 900 includes additional or fewer wireless communication networks. For example, wireless communication network 900 includes additional WPANs, WLANs, and/or WMANs. The methods and apparatus described herein are not limited in this regard.

In one embodiment, wireless communication system 900 includes one or more subscriber stations (e.g., shown as 940, 942, 944, 946, and 948). For example, the subscriber stations 940, 942, 944, 946, and 948 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart-rate monitor, a blood-pressure monitor, etc.), and other suitable fixed, portable, or mobile electronic devices. In one embodiment, wireless communication system 900 includes more or fewer subscriber stations.

In one embodiment, subscriber stations 940, 942, 944, 946, and 948 use a variety of modulation techniques, such as spread-spectrum modulation (e.g., direct-sequence code division multiple access (DS-CDMA), frequency-hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MCM), other suitable modulation techniques, or combinations thereof, to communicate via wireless links.

In one embodiment, laptop computer 940 operates in accordance with suitable wireless communication protocols that require very low power, such as, for example, Bluetooth.RTM., ultra-wide band (UWB), radio frequency identification (RFID), or combinations thereof, to implement the WPAN 910. In one embodiment, laptop computer 940 communicates with devices associated with the WPAN 910, such as, for example, video camera 942, printer 944, or both via wireless links.

In one embodiment, laptop computer 940 uses direct-sequence spread spectrum (DSSS) modulation, frequency-hopping spread spectrum (FHSS) modulation, or both to implement the WLAN 920 (e.g., a basic service set (BSS) network in accordance with the 802.11 family of standards developed by the Institute of Electrical and Electronic Engineers (IEEE) or variations and evolutions of these standards). For example, laptop computer 940 communicates with devices associated with the WLAN 920 such as printer 944, handheld computer 946, smart phone 948, or combinations thereof, via wireless links.

In one embodiment, laptop computer 940 also communicates with access point (AP) 950 via a wireless link. AP 950 is operatively coupled to router 952 as described in further detail below. Alternatively, AP 950 and router 952 may be integrated into a single device (e.g., a wireless router).

In one embodiment, laptop computer 940 uses OFDM modulation to transmit large amounts of digital data by splitting a radio frequency signal into multiple small sub-signals, which in turn, are transmitted simultaneously at different frequencies. In one embodiment, laptop computer 940 uses OFDM modulation to implement WMAN 930. For example, laptop computer 940 operates in accordance with the 802.16 family of standards developed by IEEE to provide for fixed, portable, mobile broadband wireless access (BWA) networks (e.g., the IEEE std. 802.16, published 2004), or combinations thereof, to communicate with base stations, shown as 960, 962, and 964, via wireless link(s).

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 920 and WMAN 930 are operatively coupled to network 970 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 920 is operatively coupled to network 970 via AP 950 and router 952. In another embodiment, WMAN 930 is operatively coupled to network 970 via base station(s) 960, 962, 964, or combinations thereof. Network 970 includes one or more network servers (not shown).

In one embodiment, wireless communication system 900 includes other suitable wireless communication networks, such as, for example, wireless mesh networks, shown as 980.

In one embodiment, AP 950, base stations 960, 962, and 964 are associated with one or more wireless mesh networks. In one embodiment, AP 950 communicates with or operates as one of mesh points (MPs) 990 of wireless mesh network 980. In one embodiment, AP 950 receives and transmits data in connection with one or more of MPs 990. In one embodiment, MPs 990 include access points, redistribution points, end points, other suitable connection points, or combinations thereof, for traffic flows via mesh paths. MPs 990 use any modulation techniques, wireless communication protocols, wired interfaces, or combinations thereof, described above to communicate.

In one embodiment, wireless communication system 900 includes a wireless wide area network (WWAN), such as a cellular radio network (not shown). Laptop computer 940 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless-access technologies (e.g., 3G, 4G, etc.) standards based on these technologies, variations and evolutions of these standards, and other suitable wireless communication standards. Although FIG. 4 depicts a WPAN, a WLAN, and a WMAN. In one embodiment, wireless communication system 900 includes other combinations of WPANs, WLANs, WMANs, and WWANs. The methods and apparatus described herein are not limited in this regard.

In one embodiment, wireless communication system 900 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 940, 942, 944, 946, and 948) AP 950, or base stations (e.g., 960, 962, and 964) includes a serial interface, a parallel interface, a small computer system interface (SCSI), an Ethernet interface, a universal serial bus (USB) interface, a high-performance serial bus interface (e.g., IEEE 1394 interface), any other suitable type of wired interface, or combinations thereof, to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 5:
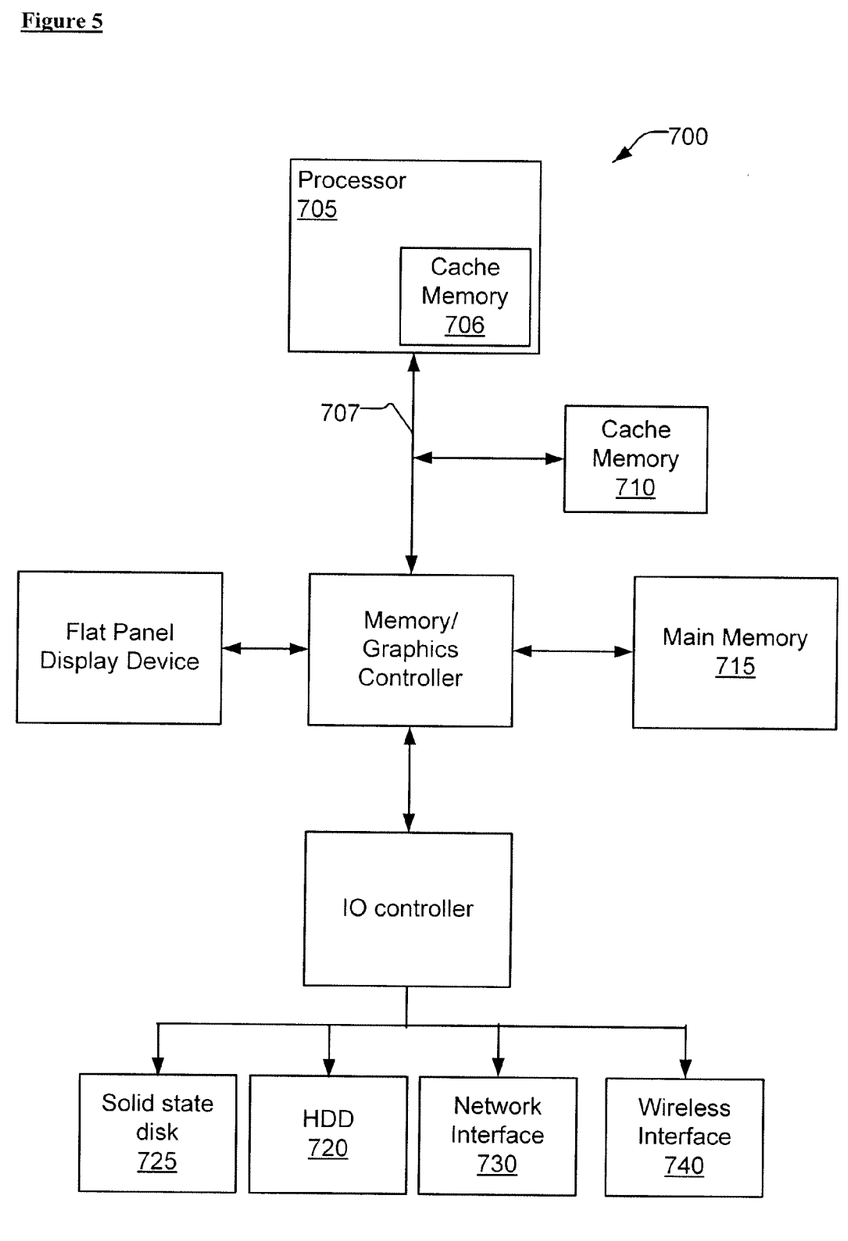
FIG. 5 illustrates a computer system for use with one embodiment of the present invention.

FIG. 5 illustrates an example of a computer system in conjunction with one embodiment of the invention. Processor 705 accesses data from level 1 (L1) cache memory 706, level 2 (L2) cache memory 710, and main memory 715. In one embodiment, cache memory 710 is a shared cache for more than one processor core.

In one embodiment, memory/graphic controller 716, IO controller 717, or combinations thereof, is integrated in processor 705. In one embodiment, parts of memory/graphic controller 716, parts of IO controller 717, or combinations thereof, is integrated in processor 705.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid-state disk 725 based on NVRAM technology, or a memory source located remotely from the computer system via network interface 730 or via wireless interface 740 containing various storage devices and technologies. The cache memory may be located either within the processor or in close proximity to the processor, such as on the local bus 707 of the processor. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method for transmitting system parameters of a wireless communication network, comprising:
processing, by a network device, a super-frame containing a plurality of frames for communication using orthogonal frequency division multiple access (OFDMA), wherein a first frame header of the plurality of frames comprises a primary header and a secondary header, the primary header including first data indicative of whether each one or more sub-packets exist in the secondary header, and wherein one or more sub-packets comprise at least a first parameter common to both a first protocol according to IEEE 802.16e and a second protocol according to IEEE 802.16m.

2. The method of claim 1, further comprising,
transmitting a first sub-packet of the sub-packets at a different interval than a second sub-packet of the sub-packets based at least on latency requirements associated with operations that use information contained in the first and the second sub-packets.

3. The method of claim 2, wherein a sub-packet of the sub-packets comprise second data indicative of whether or not the sub-packet comprises two portions including a first portion common to both a first protocol and a second protocol and a second portion dedicated to the first protocol.

4. The method of claim 1, wherein the secondary header contains system configuration information of the network.

5. The method of claim 1, wherein the primary header comprises a bitmap, in which each bit of the bitmap corresponds to a sub-packet of the secondary header.

6. A method for transmitting system configuration information of a wireless network, comprising,
processing, by a network device, a super-frame containing a plurality of frames, wherein a first frame header of the plurality of frames comprises a first header and a second header transmitted via a first sub-channel and a second sub-channel respectively, the second header comprising a plurality of sub-packets containing at least part of the system configuration information; and
determining, by the network device, whether a first parameter in a sub-packet of the sub-packets is common to both a first wireless standard and a second wireless standard.

7. The method of claim 6, wherein the first header contains first data indicative of whether the second header contains one or more sub-packets.

8. The apparatus of claim 6, wherein each of the plurality of sub-packets comprises a plurality of system parameters.

9. The method of claim 6, further comprising omitting a sub-packet of the sub-packets in another super-frame based at least on a latency requirement associated with operations that use information contained in the sub-packet.

10. A network system, comprising:
a processor;
a memory coupled to the processor; and
a communication device coupled to the processor to communicate wirelessly over multiple sub-channels in an orthogonal frequency division multiple access (OFDMA) wireless network, wherein the communication device is operable to process a super-frame containing a plurality of frames, wherein a first frame header of the plurality frame comprises a first header and a second header, the first header comprises first data indicative of whether each one or more groups of parameters exist in the second header, and wherein the second header comprises at least a first parameter common to both a first protocol according to IEEE 802.16e and a second protocol according to IEEE 802.16m.

11. The apparatus of claim 10, wherein each of the one or more groups of parameters is in a sub-packet.

12. The apparatus of claim 10, wherein the communication device is operable to transmit a first group of parameters at a first interval and to transmit a second group of parameters at a second interval, based at least on latency requirements associated with the first and the second groups of parameters.

\* \* \* \* \*

UNITED STATES PATENT AND TRADEMARK OFFICE
CERTIFICATE OF CORRECTION

PATENT NO. : 8,218,424 B2  
APPLICATION NO. : 12/638846  
DATED : July 10, 2012  
INVENTOR(S) : Sassan Ahmadi et al.

Page 1 of 1

It is certified that error appears in the above-identified patent and that said Letters Patent is hereby corrected as shown below:

On the Title page in Item (56), in column 2, under "Other Publications", line 1, delete "Internationai" and insert -- International --, therefor, In the Claims:

In column 12, line 36, in claim 8, delete "apparatus" and insert -- method --, therefor, In column 12, line 58, in claim 11, delete "apparatus" and insert -- method --, therefor, and In column 12, line 60, in claim 12, delete "apparatus" and insert -- method --, therefor.

Signed and Sealed this
Seventh Day of May, 2013

Teresa Stanek Rea
*Acting Director of the United States Patent and Trademark Office*